UNITED STATES PATENT OFFICE.

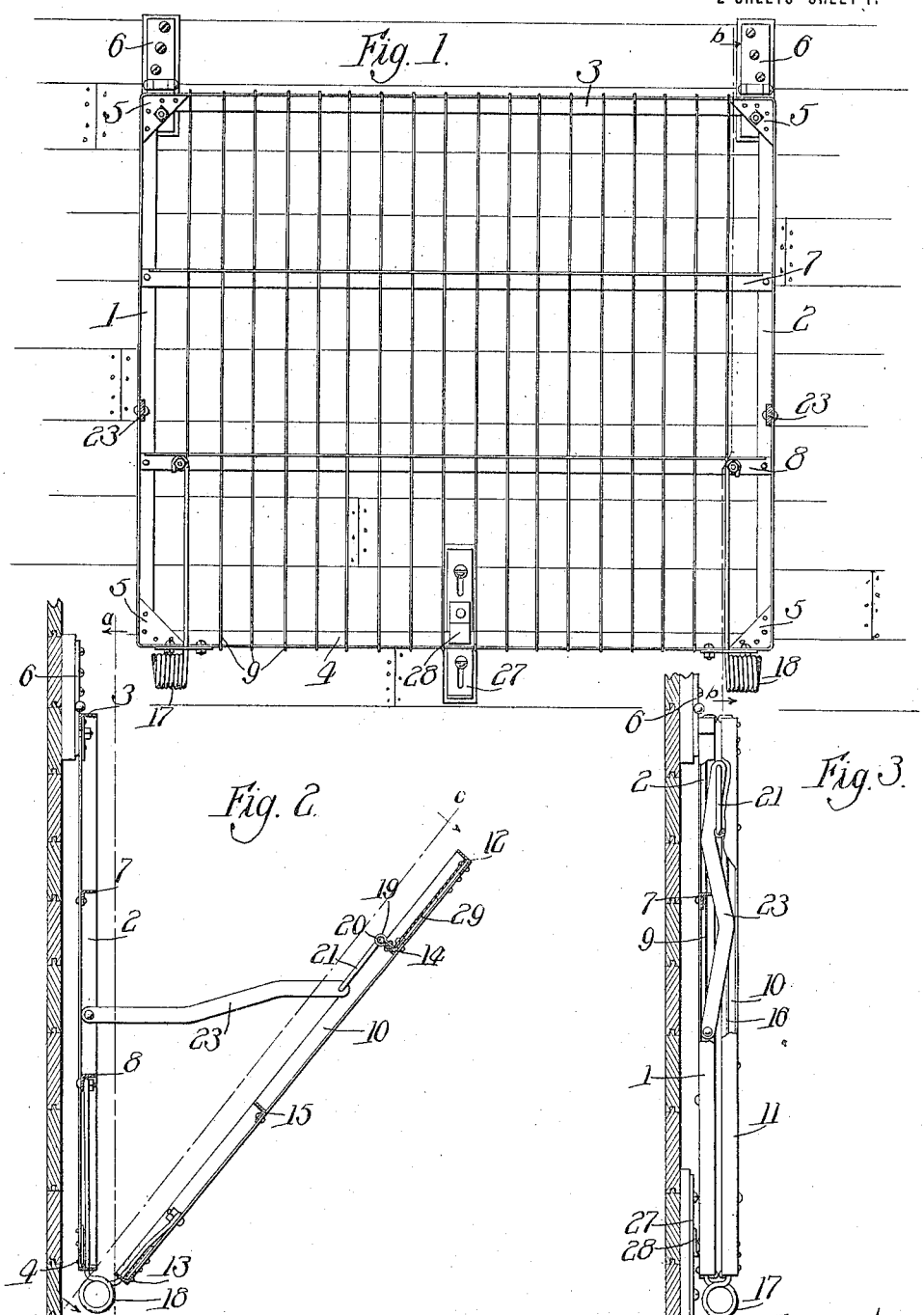

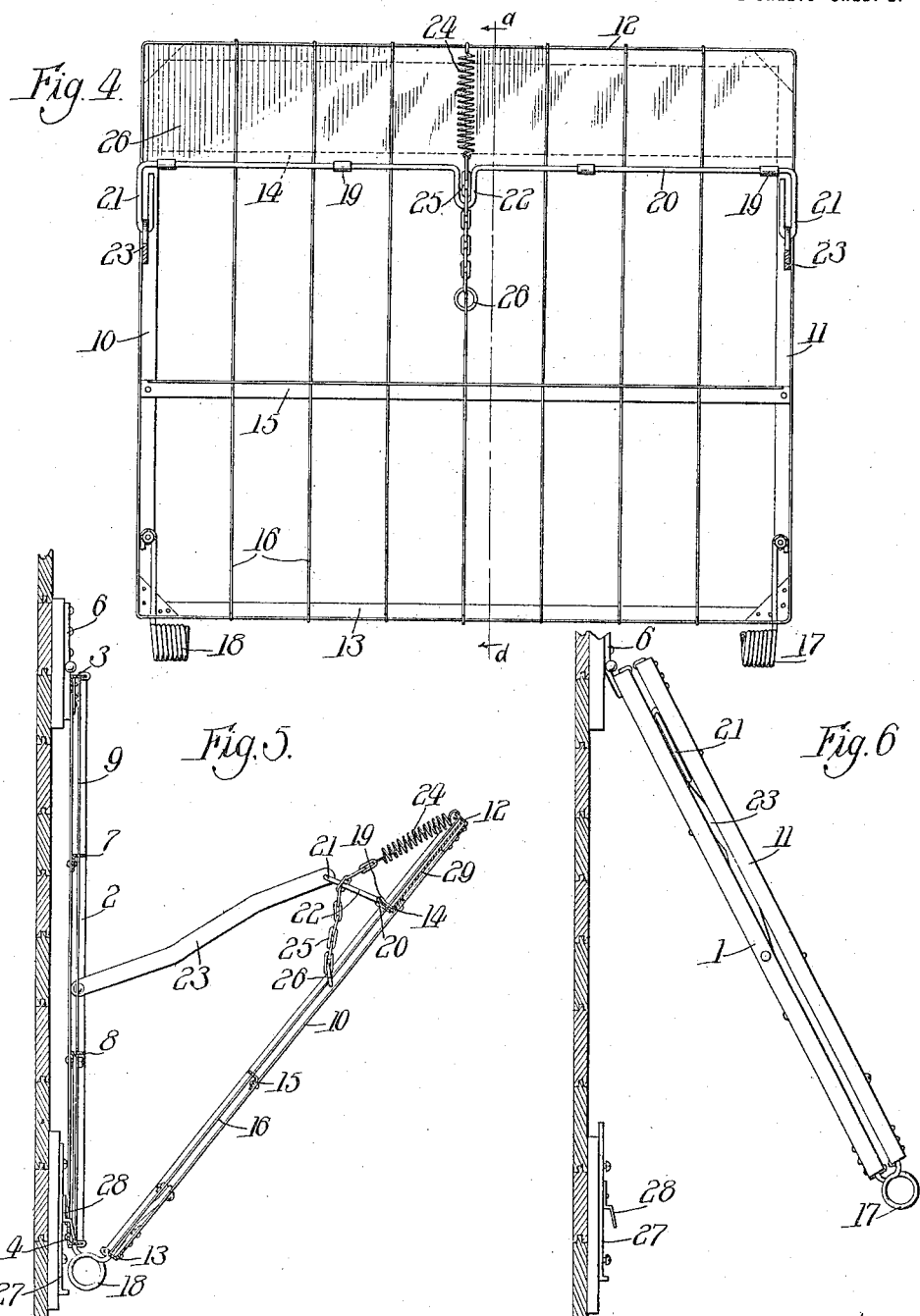

ROSWELL R. SHIRLEY, OF ROCKFORD, ILLINOIS.

HAY-FEEDER.

1,153,263.  Specification of Letters Patent.  Patented Sept. 14, 1915.

Application filed July 11, 1912. Serial No. 708,915.

*To all whom it may concern:*

Be it known that I, ROSWELL R. SHIRLEY, a citizen of the United States, residing at Rockford, in the county of Winnebago and State of Illinois, have invented certain new and useful Improvements in Hay-Feeders, of which the following is a specification.

The object of this invention is to construct a novel hay feeder for domestic animals, which will as the hay is gradually consumed, automatically fold up, so that no manual attention except to refill is required and which will occupy only a small space on the side of a wall or suitable support.

Another object is to provide a novel means for limiting the opening movement of the rack and for locking the rack in open position.

A further object is to provide a thoroughly sanitary hay feeder that can easily be kept clean and also retain a high efficiency.

In the accompanying drawings: Figure 1 is a section on the line *a a* of Fig. 2, showing the manner of supporting the feeder. Fig. 2 is a transverse section on the line *b b* of Fig. 1, showing the feeder open. Fig. 3 is a side elevation, a part being broken away, and showing the feeder closed. Fig. 4 is a section on the line *c c* of Fig. 2, showing the front rack. Fig. 5 is a section on the line *d d* of Fig. 4, the closing lever being raised and the feeder about to be folded up. Fig. 6 is a side elevation of the feeder closed, and the bottom swung out to facilitate cleaning.

A rectangular shaped frame made of any suitable material, in this case of angle iron strips, comprising vertical side portions 1 and 2 and horizontal upper and lower portions 3 and 4, constitute the frame of the back rack. Riveted to the four corners of this rack are the brace plates 5, the upper ones having bolted thereto, hinges 6, which are fastened to a wall or any suitable support, and which form the pivotal support for the hay feeder. Riveted to the portions 1 and 2 are the horizontal brace sections 7 and 8, which have running therethrough, a plurality of vertical wires 9 having their ends secured to the portions 3 and 4. The front rack also of a rectangular shape is made of angle iron strips, comprising the vertical portions 10 and 11 and the upper and lower portions 12 and 13, and has riveted to the portions 10 and 11, two horizontal brace sections 14 and 15, through which pass a plurality of vertical wires 16, which are secured to the members 12 and 13, and suitably spaced to allow an animal to obtain hay from the feeder.

The back rack and the front rack are connected by the coiled springs 17 and 18, which form a yielding pivotal connection, tending to close the feeder, and which have one of the ends of the springs bolted to the section 8 and the other ends bolted to the portions 10 and 11, as shown in Figs. 1 and 4.

Pivotally supported by the bearing plates 19 on the section 14, is the locking rod 20, which has the bent end crank portions 21, and central crank portion 22, all lying in the same plane.

Pivoted to the end crank portions 21 are the side links 23, having a pivotal connection with the vertical portions 1 and 2.

To the central crank portion 22 is secured means for imparting an upward pull, in this case shown as a coiled spring 24 connected at one end to the frame portion 12 and at its other to the chain 25, which is secured to the crank 22 and has an extension which terminates in a ring 26 encircling one of the wires 16.

Lying intermediate the angle sections 12 and 14 and supported thereby, is the plate 26, which forms a protection for the releasing device 24 and 25.

The plate 27 is supported in any suitable manner, so as to be capable of vertical adjustment, the construction shown comprising vertical slots in the plate, and stationary screw-bolts. The plate has rigidly secured thereto a projecting plate 28 having a downstanding extension which is adapted to overhang the frame portion 4 and hold the back rack of the feeder rigid.

The operation of my novel hay feeder is as follows: Presuming the feeder to be folded up and in an inoperative position, the front rack is swung down until the lever 23 and crank 21 lie in the same plane, when the ring 26 is grasped by hand and pulled down, thereby bringing the crank to rest against the members 10 and 11, thus locking the device against the closing tendency imparted to it by the coiled springs 17 and 18. The hay feeder in this open position is filled with hay, then the front rack is pulled down, bringing the lever 23 and crank portions 21 in a direct line, whereupon the spring 24 will raise the crank 22 above the center line and allow the front rack, by the action of the coiled springs 17 and 18 to be gradually closed up as the hay is consumed. When the hay feeder has closed, the lever 23 and the crank 21 will assume a position as shown in Fig. 3.

To clean behind the feeder, the screws holding the plate 27 are loosened and the plate is raised, to release the feeder and permit it to be swung out into the position in Fig. 6.

I claim as my invention:

1. In a feeding device, the combination, of a back rack, a front rack pivoted thereto, means for locking the front rack in an open position, comprising, a locking bar pivoted to the front rack, having crank portions formed at its ends, pivoted links forming a connection between the crank portions and the back rack, the front rack being adapted to be manually operated for releasing it from said locked position, and means for automatically moving the front rack to a closed position.

2. In a feeding device, the combination, of a back rack, a front rack pivoted thereto, means for locking the front rack in an open position, comprising, a locking bar pivoted to the front rack, having crank portions formed at its ends and its center portion, pivoted links forming a connection between the end crank portions and the back rack, means for releasing the front rack from said locked position, comprising, a yielding connection between the center crank portion and the front rack, and means for automatically moving the front rack to a closed position.

3. In a feeding device, the combination, of a back rack, a front rack pivoted thereto, means for locking the front rack in an open position, comprising, a locking bar pivoted to the front rack, having crank portions formed at its ends, pivoted links forming a connection between the crank portions and the back rack, means for releasing the front rack from said locked position, and means for automatically moving the front rack to a closed position.

4. In a feeding device, the combination of a back rack, a front perforate rack pivoted thereto, and means for locking the front rack in an open position, said means comprising a link pivoted at one end to the front rack, a link pivoted at one end to the back rack and being pivotally connected to the front rack link, said links being disposed intermediate the racks and adapted to limit swinging of the front rack in an open position and to permit their pivotal connection to swing past the center of their rack pivotal connections to effect locking of the front rack in said open position, and means for automatically moving the said pivoted connection of the links past said center of their rack connections.

5. A feeding device of the character set forth, comprising a back, a perforate rack pivotally connected thereto, means for urging the rack toward the back, and means for locking the rack in an open position, including a connection between the back and rack adapted to limit the extent of opening movement.

6. A feeding device comprising a back, a rack pivoted thereto at its lower edge, a link pivoted to said back, and a member pivoted to the rack and pivotally connected with said link, said member being mounted on the rack to swing into a position substantially parallel with said rack whereby the link is held in position to retain said rack in open position.

7. A feeding device comprising a back, a rack pivoted thereto at its lower edge, a link pivoted at one end to said back, and a member pivoted to the other end of the link and pivotally connected to the rack so as to fold against the rack above its pivot when the rack is closed and fold against the rack below its pivot when the said rack is open so that the link is positioned thereby to hold the rack against closing.

In testimony whereof I have hereunto set my hand in presence of two subscribing witnesses.

ROSWELL R. SHIRLEY.

Witnesses:
A. O. BEHEL,
E. D. E. N. BEHEL.

Copies of this patent may be obtained for five cents each, by addressing the "Commissioner of Patents, Washington, D. C."